United States Patent [19]
Hobbs et al.

[11] 3,914,296
[45] Oct. 21, 1975

[54] LIQUID PHASE OXIDATION OF ALCOHOLS TO FORM CARBOXYLIC ACIDS THEREFROM

[75] Inventors: Charles C. Hobbs, Nueces, Tex.; Hendrik A. van't Hof, Brielle, Netherlands

[73] Assignee: Celanese Corporation, New York, N.Y.

[22] Filed: Jan. 4, 1974

[21] Appl. No.: 430,836

[52] U.S. Cl...... 260/530 R; 260/514 R; 260/514 H; 260/523 A; 260/531 R; 260/540; 260/541
[51] Int. Cl.² ........................................ C07C 51/26
[58] Field of Search .................... 260/530 R, 531 R

[56] References Cited
UNITED STATES PATENTS

| | | | |
|---|---|---|---|
| 2,184,555 | 12/1939 | Kenyon | 260/530 R |
| 2,263,607 | 11/1941 | Bludworth | 260/530 R |
| 2,425,882 | 8/1947 | Hull | 260/531 R |
| 2,552,175 | 5/1951 | Hull | 260/530 R |
| 2,756,248 | 7/1956 | Hujsak et al. | 260/530 R |
| 3,539,592 | 11/1970 | Crowther | 260/530 R |

*Primary Examiner*—Anton H. Sutto
*Assistant Examiner*—Richard D. Kelly

[57] ABSTRACT

An improved liquid phase oxidation process wherein greater amounts of alcohols such as ethyl alcohol can be oxidized to carboxylic acids such as acetic acid by including at least one ketone such as methyl ethyl ketone and at least one aldehyde such as acetaldehyde in the reaction mixture. In a particularly advantageous embodiment, a liquid feed or reaction mixture comprising from about 40 to 65% ethyl alcohol, about 15 to 50% methyl ethyl ketone, and about 5 to 20% acetaldehyde is oxidized to acetic acid using air, cobalt acetate catalyst, and acetic acid reaction medium.

4 Claims, No Drawings

LIQUID PHASE OXIDATION OF ALCOHOLS TO FORM CARBOXYLIC ACIDS THEREFROM

BACKGROUND OF THE INVENTION

1. Field of the Invention

This invention relates to improvements in the liquid phase oxidation of alchols to form carboxylic acids therefrom.

2. Summary of the Prior Art

Carboxylic acids, and particularly acetic acid, have many uses. For example, acetic acid may be used as a solvent or reagent in the production of rubber, plastics, pharmaceuticals, dyes, insecticides and other organic and inorganic chemicals.

Acetic acid may be produced by several processes including the liquid phase oxidation of various organic compounds such as ethanol. In general, such a liquid phase oxidation process involves the direct reaction of ethanol with oxygen in a liquid reaction medium. See, for example, U.S. Pat. No. 2,552,175.

In the past, lower rates of conversion have been incurred if too great an amount of ethanol was fed to the reaction zone. Indeed, if enough ethanol is added to the reaction zone, the oxidation reaction will die or terminate. This problem is present even where an aldehyde such as acetaldehyde is used as an activator, as in U.S. Pat. No. 2,552,175.

The search has continued, therefore, for improved liquid phase oxidation processes able to oxidize even greater amounts of ethanol to acetic acid. The present invention was made as a result of this search.

SUMMARY OF THE INVENTION

Accordingly, the primary object of the present invention is to provide an improved process for liquid phase oxidation of alcohols to form carboxylic acids therefrom.

Another more particular object of the present invention is to provide a novel liquid phase oxidation process for converting ethanol to acetic acid in amounts greater than that converted by prior art processes.

Another more particular object of the present invention is to provide a novel liquid phase oxidation process having an improved activator composition for support of the oxidation reaction.

Another more particular object of the present invention is to oxidize as much ethyl alcohol or other alcohol, per unit weight of activators consumed, as possible.

In accordance with the present invention, a liquid reaction mixture containing at least one alcohol, at least one ketone, and at least one aldehyde is formed, and this liquid reaction mixture is oxidized with a gas comprising molecular oxygen to form an oxygenated reaction product mixture from which carboxylic acid reaction product is recovered.

The essence of one aspect of the present invention is the discovery that greater amounts of alcohols such as ethyl alcohol can be oxidized in liquid phase to carboxylic acids such as acetic acid if the feedstock or liquid reaction mixture additionally comprises both a ketone such as methyl ethyl ketone and an aldehyde such as acetaldehyde rather than only one of them. The essence of another aspect of the present invention is the discovery that one can maximize the ratio of the amount of consumed or converted ethyl alcohol or other alcohol to the amount of activator consumed or used up by using a feedstock or liquid reaction mixture which comprises a ketone such as methyl ethyl ketone and an aldehyde such as acetaldehyde rather than only one of them. In other words, a new and more efficient activator or additive comprising a mixture of a ketone and an aldehyde has been found for the liquid phase oxidation of alcohols to carboxylic acids. This new activator or additive is better and more efficient than the above-discussed prior art additive, since more alcohol can be converted to acetic acid per part of additive consumed or used up during the oxidation reaction. As a more specific example, more ethyl alcohol can be converted to acetic acid per part by weight of the total amount of methyl ethyl ketone and acetaldehyde consumed or converted during the reaction than per part by weight of either methyl ethyl ketone or acetaldehyde alone, i.e., when one is present without the other.

Other objects, aspects, and advantages of the present invention will become apparent to one skilled in the art from the following description of the preferred embodiments.

DESCRIPTION OF THE PREFERRED EMBODIMENTS

While the most preferred embodiment of the present invention is illustrated in the production of acetic acid from ethyl alcohol, methyl ethyl ketone, and acetaldehyde, other carboxylic acids may be similarly produced from corresponding mixtures of alcohols, ketones and aldehydes.

The carboxylic acids which may be produced in accordance with the present invention include lower aliphatic monocarboxylic acids represented by the structural formula

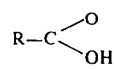

wherein R is hydrogen or an alkyl or cycloalkyl group of from 1 to 6 carbon atoms. R is preferably an alkyl group of 1 to 6 carbon atoms.

Non-limiting examples of such carboxylic acids include formic acid, acetic acid, propionic acid, butyric acid, valeric acid, hexanoic acid, hexahydrobenzoic acid (cyclohexanecarboxylic acid), cyclopentanecarboxylic acid, cyclobutanecarboxylic acid, and the like. Acetic acid and propionic acid are particularly suitable.

Alcohols which may be subjected to liquid phase oxidation processes to produce carboxylic acids are well known. Such alcohols include lower aliphatic alcohols represented by the formula $R_1$—OH wherein $R_1$ is an alkyl or cycloalkyl group of from 1 to 6, preferably 2 to 5, carbon atoms. Ethanol is particularly preferred.

Other non-limiting examples of such alcohols include methyl alcohol, n-propyl alcohol, isopropyl alcohol, n-butyl alcohol, sec-butyl alcohol, isoamyl alcohol, n-hexyl alcohol, and cyclohexanol.

The ketones which may be used in accordance with the present invention include lower aliphatic ketones such as those represented by the structural formulas

wherein $R_2$ and $R_3$ represent alkyl groups of from 1 to 6, preferably 1 to 5 carbon atoms, and wherein $R_4$ represents a cycloalkylidene group of from 4 to 20, preferably 5 to 10, carbon atoms. Methyl ethyl ketone is particularly preferred.

Other non-limiting examples of such ketones include dimethyl ketone, methyl propyl ketone, methyl butyl ketone, methyl amyl ketone, diethyl ketone, ethyl propyl ketone, ethyl butyl ketone, dipropyl ketone, and cyclohexanone.

The aldehydes which may be used in accordance with the present invention include lower aliphatic aldehydes such as those represented by the structural formula

wherein $R_5$ represents an alkyl, cycloalkyl, or aryl group of from 1 to 7, preferably an alkyl group of from 1 to 3, carbon atoms. Acetaldehyde is particularly preferred.

Other non-limiting examples of such aldehydes include propionaldehyde, butyraldehyde, valeraldehyde, hexanal, and benzaldehyde.

Substituted derivatives, which do not detrimentally affect the oxidation reaction, of the above-described alcohols, ketones and aldehydes may also be suitable in the present invention. Non-limiting examples of possible substituents on the carbon groups include lower alkyl esters, ethers, and acetals.

The above-described alcohols, ketones and aldehydes may be prepared or produced by any of the well known methods.

The process of the present invention may be practiced by oxidizing a liquid reaction mixture of one or more of the above-described alcohols, one or more of the above-described ketones, and one or more of the above-described aldehydes with a gas comprising molecular oxygen.

For example, a mixture of about 10 to 85% and preferably from above about 30 to about 75% alcohol, about 10 to 75% and preferably about 15 to 60% ketone, and about 5 to 50% and preferably about 5 to 25% aldehyde, based on the total weight of material to be oxidized, may be satisfactory. Most preferably, a mixture of about 40 to 65% ethanol, about 15 to 50% methyl ethyl ketone and about 5 to 20% acetaldehyde is used.

Upon oxidation, the above-described reaction mixtures of alcohols, ketones, and aldehydes commonly produce oxygenated reaction product mixtures including several different carboxylic acids, which mixtures may be separated by well-known distillation methods. Preferably, combinations of the above-described alcohols, ketones and aldehydes are used to give only one or predominately only one acid. For example, a mixture of ethanol, methyl ethyl ketone and acetaldehyde upon oxidation yields substantially only acetic acid, although minor amounts, e.g., 1 to 5%, of other carboxylic acids such as formic acid and propionic may also be present.

Further, the lower alcohols, ketones and aldehydes are generally more efficient, i.e., more easily convertible to carboxylic acids, than the higher alcohols, ketones and aldehydes. For example, acetaldehyde may be more efficient than propionaldehyde; methyl ethyl ketone may be more efficient than ethyl propyl ketone, and ethanol may be more efficient than propanol. Moreover, the resulting acids are more resistant to further oxidation and can thus be isolated with better efficiency or yield.

Also, the more branched alcohols, ketones and aldehydes are less efficient than less branched or straight chain alcohols, ketones, and aldehydes. For example, n-butyl alcohol may be more efficient than isobutyl alcohol, and so forth.

Air is commonly employed as the source of molecular oxygen, allthough a pure oxygen gas may also be employed. The molecular oxygen may be provided in at least a stoichiometrically sufficient amount to convert the material to be oxidized to carboxylic acid and to compensate or allow for by-products such as carbon dioxide. The ratio of total feed of oxygen to total feed of organic starting material is a highly variable number which depends upon the specific composition of the feed, the desired products, and other process design factors. Typically, the oxygen-containing gas is bubbled through the liquid reaction mixture in an amount sufficient to prevent oxygen starvation which may be indicated by a low concentration of oxygen and/or a high ratio of carbon monoxide to carbon dioxide in the vent gas.

The oxidation reaction is conducted in the liquid phase, i.e., the material to be oxidized is in a liquid reaction medium. Typically, the liquid reaction medium is a solvent for the compounds to be oxidized and is relatively inert, i.e., does not react chemically at any significant rate under the conditions of oxidation. Suitable liquid reaction mediums include the above-discussed carboxylic acids. Acetic acid is preferred. Typically, the carboxylic acid reaction product or products serve as the solvent in which the reaction takes place.

The reaction may be carried out at any temperature and pressure sufficient to maintain the liquid phase oxidation. For example, temperatures of about 50° to 200°C, preferably 75° to 150°C, and most preferably 110° to 140°C, may be used.

Superatmospheric pressure is generally required, and pressures of about 50 to 1,000 psia, preferably 75 to 300 psia, and typically 75 to 150 psia, may be used.

Reaction or reactor residence times may be from about 0.1 to 5 hours, more typically about 0.5 to 3 hours, and most typically about 1 to 2 hours.

The liquid phase oxidation process of the present invention is usually conducted in the presence of a catalyst. Liquid phase oxidation catalysts are well known and per se are not part of the present invention.

Typical liquid phase oxidation catalysts include metals from Groups 1b, 5b, 6b, 7b, 8b and the Lanthanide series of the Periodic Table in the form of a compound soluble in the liquid reaction mixture. The Periodic Table referred to herein is the Periodic Table of the Elements appearing immediately after p. 948 of Organic Chemistry, by Morrison and Boyd; Allyn and Bacon, Inc. (1959 Ed.).

Non-limiting examples of such catalysts include the carboxylic acid-soluble compounds of cobalt, manganese, nickel, copper, cerium, praseodymium, neodymium, lanthanum, samarium, iron, mercury, chromium, antimony, uranium, molybdenum, terbium, tungsten, tantalum, columbium, vandium, zirconium, titanium, lead, tin, platinum, iridium, osmium, gold and silver, and particularly the salts of these metals with carboxylic acids such as, for example, acetic acid, propionic acid, butyric acid, isobutyric acid, valeric acid, benzoic acid and napthenic acid.

Cobalt acetate is particularly advantageous when ethanol, methyl ethyl ketone and acetaldehyde are being oxidized to acetic acid.

The above-described oxidation catalysts may be present during oxidation in an amount of about 1 to 50,000 ppm, preferably 100 to 5,000 ppm, and most preferably 200 to 2,000 ppm, based on the weight of solvent or liquid reaction medium.

The above-described liquid phase oxidation reaction may be carried out in any known stirred or non-stirred reactor or reaction vessel on a continuous, semi-continuous, or batch basis. A suitable tower reactor and its operation are described in U.S. Pat. No. 2,702,741, which is incorporated herein by reference.

The carboxylic acid may be recovered from the oxygenated reaction product mixture by various means known in the art, typically including distillation. Any carboxylic acid values contained in ester form in the reaction product may also be recovered by hydrolysis followed by solvent extraction and distillation as is well known to those skilled in the art. The carboxylic acid values in ester form may also be recycled to the reaction zone for further reaction.

The invention is additionally illustrated by the following examples; all parts, percentages and ratios are by weight in the examples, as well as in other parts of the specification and claims, unless otherwise indicated.

Specific Examples

Several runs (Nos. 5 to 9) in accordance with the present invention were carried out in a reaction system comprising a vertical cylindrical reaction vessel provided with suitable fittings for feeding or injecting the reactants, including air, and catalyst solution (cobalt acetate dissolved in acetic acid) into the interior of the vessel, as well as a suitable outlet for recovery or take-off of a portion of the oxygenated reaction product mixture. A recycle conduit including a conventional centrifugal pump was also connected to the outlet for recycling a portion of the reaction mixture back into the reactor. By suitably adjusting valves in the various fittings, a ratio of recycled reaction mixture to recovered or collected reaction mixture of about 1000:1 was maintained. The reaction vessel was equipped with an electrical resistance heater to maintain reaction temperature; and vapors coming overhead from the liquid reaction mixture were condensed in a water-cooled condenser and returned to the liquid reaction mixture. A vent connected through a conventional cold trap to the upper end of the condenser was provided for removing any uncondensed vapors. In each of the runs, the reaction was allowed to "line-out", i.e., come to approximately steady-state conditions. Next, a "timed run" was made, and during this timed run, all of the readings were taken and the volume and weight of the material fed to the reactor were measured. The liquid reactor feed and the catalyst solution were continuously supplied to the reactor and a portion of liquid oxygenated reaction product mixture was continuously withdrawn from the reactor, so as to maintain an approximately constant volume of liquid reaction mixture within the reactor during the timed runs. The reaction mixture was then analyzed using conventional procedures. Comparative runs (Nos. 1, 2 and 4) were carried out using the same apparatus and general procedure. Other data and the results for runs 1 to 9 are shown in TABLE I.

TABLE I[a]

| Run number | 1 | 2[b] | [3][c] | 4[b] | 5 | 6 | 7 | 8 | 9 |
| --- | --- | --- | --- | --- | --- | --- | --- | --- | --- |
| Composition of reactor feed, % | | | | | | | | | |
| Ethyl alcohol (EtOH) | 30 | 50 | [20] | 50 | 40 | 42.5 | 50 | 65 | 60 |
| Methyl ethyl ketone (MEK) | 59 | 42.5 | — | — | 46 | 36 | 25 | 17 | 17 |
| Acetaldehyde (AcH) | — | — | [80] | 50 | 5 | 15 | 20 | 15 | 20 |
| Other (substantially all acetic acid) | 11 | 7.5 | — | — | 9 | 6.5 | 5 | 3 | 3 |
| Co catalyst in reaction mixture, ppm | 1000 | 1000 | [ 6%] | 1000 | 1000 | 1000 | 1000 | 2000 | 1000 |
| Length of timed run, hrs | 2 | — | — | — | 2 | 2 | 2 | 2 | 2 |
| Reactor feed during timed run, g | 180.0 | — | — | — | 195.8 | 225.2 | 238.5 | 134.6 | 216.0 |
| Catalyst soln[d] during timed run, g | 50.2 | — | — | — | 49.6 | 57.5 | 61.9 | 77.8 | 54.3 |
| Average reactor pressure[e] psia | 79 | 79 | | 79 | 79 | 79 | 79 | 79 | 79 |
| Average temperature, °C | | 135 | | 135 | | | | | |
| Base of reactor | 132 | — | [60] | — | 131 | 129 | 129 | 128 | 130 |
| Middle of reactor | 130 | — | — | — | 129 | 125 | 131 | 122 | 130 |
| Wt of reactor prod collected during timed run, g | 272.4 | — | — | — | 280.0 | 340.5 | 358.9 | 197.7 | 344.2 |
| Wt of material collected in cold trap during timed run, g | 12.0 | — | — | — | 5.5 | 13.9 | 16.1 | 20.3 | 10.6 |
| Results of analysis[f], wt% | | | | | | | | | |
| Acetic Acid | 64.0 | — | — | — | 62.9 | 62.6 | 61.7 | 44.8 | 71.7 |
| EtOH | 1.0 | — | [ 2] | — | 1.98 | 1.8 | 3.2 | 7.6 | 2.1 |
| MEK | 11.98 | — | — | — | 8.8 | 7.25 | 6.2 | 3.8 | 2.35 |
| H$_2$O | 12.6 | — | — | — | 15.6 | 11.9 | 14.8 | 13.3 | 11.8 |
| Formic acid | 0.12 | — | — | — | 0.10 | 0.6 | 0.24 | 2.88 | — |
| Wt accountability, % | 98.7 | — | — | — | 98.0 | 95.9 | 100.0 | 97.9 | 100.5 |

TABLE I⁽ᵃ⁾—Continued

| Run number | 1 | 2[b] | [3][c] | 4[b] | 5 | 6 | 7 | 8 | 9 |
|---|---|---|---|---|---|---|---|---|---|
| Approx.[g] wt ratio of EtOH converted per part activator[h] consumed | 0.71 | 0.0 | 0.23 | 0.0 | 0.75 | 0.80 | 1.04 | 2.04 | 1.56 |

[a]The following quantities were the same in runs 1, 2 and 4 to 9:
  Volume of liquid in reactor plus recycle system, approximately 1000 ml.
  Volume of liquid in reactor alone, approximately 800 ml.
  Air rate, approximately 6.0 scfh = 3.6 scfh/in² cross-sectional area = 28 scfh/gal reactor liquid.
[b]Oxidation reaction could not be sustained.
[c]This column represents Run A of Example 1 in U.S. Patent 2,552,175
[d]The catalyst solution was 5000 ppm Co(II) in glacial acetic acid.
[e]Max. rec. pressure for equipment used.
[f]Analysis performed on reaction product plus cold trap amount, except for runs 7 to 9 where analysis performed on reaction product amount alone.
[g]Assuming all unconverted EtOH appears as EtOH in reactor product mixture.
[h](MEK), (AcH), or (MEK + AcH).

As may be seen from TABLE I, the runs (5 to 9) using both methyl ethyl ketone and acetaldehyde along with the ethanol resulted in greater amounts of ethanol being oxidized, when contrasted with comparative runs 1 to 4.

Further, when using methyl ethyl ketone as the sole activator (comparative runs 1 and 2), note that only up to about 30% ethanol may be present in the feed for sustained oxidation, and that only about up to 0.71 parts ethanol may be converted to acetic acid and by-products per part methyl ethyl ketone consumed or reacted. When using acetaldehyde alone as the sole activator (runs 3[c] and 4), only up to about 20% alcohol may be present in the reactor feed for sustained oxidation, and only about 0.23 parts ethanol was converted to acetic acid and by-products per part acetaldehyde consumed or used up.

On the other hand, when using a mixture of both methyl ethyl ketone and acetaldehyde as the activator (runs 5 to 9), up to 65% (run 8) ethyl alcohol may be present in the reactor feed, with sustained oxidation being achieved, and up to 2.04 parts ethanol may be converted per part methyl ethyl ketone and acetaldehyde consumed in the reactor.

The principles, preferred embodiments, and modes of operation of the present invention have been described in the foregoing specification. The invention which is to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for the production of lower aliphatic monocarboxylic acids, which process comprises
   a. forming a liquid reaction mixture comprising about 10 to 85% of at least one alcohol represented by the formula $R_1$—OH, wherein $R_1$ is an alkyl or cycloalkyl group of from 1 to 6 carbon atoms, about 10 to 75% of at least one ketone represented by the structural formula

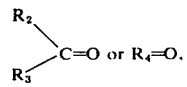

wherein $R_2$ and $R_3$ are alkyl groups of from 1 to 6 carbon atoms, and $R_4$ represents a cycloalkylidene group of from 4 to 20 carbon atoms,
   about 5 to 25% of at least one lower aldehyde represented by the structural formula

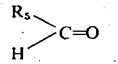

wherein $R_5$ is an alkyl or cycloalkyl group of from 1 to 7 carbon atoms,
   b. oxidizing the liquid reaction mixture in admixture with a lower aliphatic carboxylic acid reaction solvent at a temperature of about 50° to 200°C and a pressure of about 50 to 1,000 psi with a gas comprising molecular oxygen and with a catalyst which is a carboxylate salt, soluble in said admixture, of at least one metal selected from Groups 1b, 5b, 6b, 7b, 8b, and the Lanthanide series of the Periodic Table to form an oxygenated reaction product mixture and,
   c. recovering from the reaction mixture at least one lower aliphatic carboxylic acid reaction product represented by the structural formula

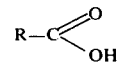

wherein R is a hydrogen or an alkyl or cycloalkyl group of from 1 to 6 carbon atoms.

2. The process of claim 1 wherein the reaction temperature is from 75° to 150°C, and wherein the reaction pressure is from 75 to 300 psi.

3. The process of claim 1 wherein the recovered carboxylic acid and the solvent are acetic acid, wherein the alcohol is ethyl alcohol, wherein the ketone is methyl ethyl ketone, and wherein the aldehyde is acetaldehyde.

4. A process for the production of acetic acid, which process comprises
   a. forming a liquid reaction mixture comprising from above about 30 to about 75% ethyl alcohol, about 15 to 60% methyl ethyl ketone, and about 5 to 25% acetaldehyde in a solvent comprising acetic acid,
   b. oxidizing the liquid reaction mixture at a temperature of about 110° to 140°C and at a pressure of about 75 to 150 psi with molecular oxygen and from 100 to 5,000 ppm of a cobalt acetate catalyst to form an oxygenated reaction product mixture and
   c. recovering acetic acid reaction product from the reaction product mixture.

* * * * *